United States Patent Office 3,421,890
Patented Jan. 14, 1969

3,421,890
FUSED CORROSION RESISTANT COBALT-CHROMIUM ALLOY
Anton Bäumel, Lank (Lower Rhine), Germany, assignor to Gebr. Bohler & Co. Aktiengesellschaft, Vienna, Austria
No Drawing. Filed Aug. 29, 1966, Ser. No. 575,532
Claims priority, application Austria, Sept. 3, 1965, A 8,071/65
U.S. Cl. 75—171    6 Claims
Int. Cl. C22c 19/00

ABSTRACT OF THE DISCLOSURE

A fused corrosion resistant cobalt-chromium alloy which is to be affixed to a metallic article by means of a welding process. Other constituents of the alloy include carbon, silicon, manganese, tungsten, molybdenum, copper, nickel and elements from the class which consists of columbium, tantalum and vanadium.

---

Filler materials consisting of hard alloys or sintered hard ceramics are used in the production of wear-resisting, hard coatings. In order to improve the abrasion resistance, the fillers contain carbides of the elements chromium, tungsten, columbium, tantalum, vanadium and boron. The carbides to improve the abrasion resistance are usually contained in the fillers used in the welding process. Such alloy may be composed, e.g., of 2.2% carbon, 30% chromium, 13% tungsten, balance cobalt and inevitable impurities. In spite of the ease with which the cobalt-chrominum matrix can be deformed, this alloy is extremely brittle owing to its high contents of co-carbides of tungsten and chromium. For this reason, the filler used for welding these hard alloys can be made only in the form of cast rods, although the manufacture of cast welding rods is an inefficient and expensive process.

For this reason it has already been suggested to use a filler wire consisting of an alloy which is free of tungsten and has a highly reduced carbon content so that the formation of carbides is suppressed in spite of the high chromium content. Such wires can easily be manufactured by hot rolling and cold drawing and owing to their high flexibility can easily be handled in the welding process. To ensure the desired abrasion resistance, a welding powder is applied during the surface welding operation. This powder contains tungsten carbide and has a carburizing effect. The hard coatings which are thus obtained have almost the same composition, substantially the same, high abrasion resistance as the hard coatings made with cast welding rods consisting of the corresponding hard alloy.

It has now been found that such hard coatings having a high abrasion resistance and high-temperature strength as well as an extremely high corrosion resistance will be obtained if the welding wires contain copper, which may be combined with nickel and/or molybdenum. The corrosion resistance of such hard coatings, particularly in a reducing environment, is a multiple of the corrosion resistance of hard coatings made from the corresponding hard alloys without copper, molybdenum and nickel, as is apparent from the following example:

TABLE 1

Chemical composition of hard coatings of cobalt-chromium-tungsten alloys with and without copper, nickel and/or molybdenum (all figures of the table represent percentages of total weight).

| COATING | 1 | 2 | 3 |
|---|---|---|---|
| Carbon | 2.2 | 2.2 | 2.2 |
| Silicon | 0.15 | 0.17 | 0.42 |
| Manganese | 0.22 | 0.17 | 0.32 |
| Chromium | 30.3 | 30.3 | 28.4 |
| Tungsten | 20.3 | 19.0 | 14.7 |
| Cobalt (balance) | 38.4 | 40.0 | 37.66 |
| Molybdenum | | 3.0 | 3.4 |
| Copper | | 2.0 | 1.3 |
| Iron | 8.8 | 2.3 | 0.2 |
| Nickel | | | 10.7 |

TABLE 2

| Coating | Weight loss in grams per square meter per hour | | | |
|---|---|---|---|---|
| | In 10% HCl | | 20% H$_2$SO$_4$ | |
| | Room temp. | Boiling temp. | Room temp. | Boiling temp. |
| 1 | 6 | 1,120 | 5.2 | 430 |
| 2 | 0.9 | 250 | 1.0 | 4.3 |
| 3 | 0.4 | 90 | 0.09 | 1.7 |

The composition of the wires which can be welded under a carburizing powder containing carbides to improve the abrasion resistance so as to produce hard coatings which have a high abrasion resistance, high high-temperature strength, and high resistance to corrosion in reducing environments, may be, e.g., in the following percent weight limits: 0–0.3% carbon, 0–3.5% silicon, 0–2.0% manganese, 15–40% chromium, 0.2–15% molybdenum, 0.2–6% copper, 1.0–25% nickel, 0–10% iron, balance cobalt, particularly 0.1% carbon, 1.2% silicon, up to 0.3% manganese, 30% chromium, 3.5% molybdenum, 1.5% copper, 8% nickel, 2% iron, balance cobalt. These alloys will be referred to as starting alloys hereinafter.

The carbides which are introduced into the hard coating during the welding process to improve the abrasion resistance may include mono- or co-carbides of chromium, tungsten, columbium, tantalum and vanadium.

If columbium, tantalum or vanadium rather than tungsten is added to the filler wire alloy, hard coatings having a high resistance to corrosion in an oxidizing environment will be obtained even when the welding wire does not contain copper, molybdenum and nickel. This is apparent from the following example:

TABLE 3

Chemical composition of hard coatings of alloys of cobalt, chromium, and tungsten and of cobalt, chromium, and columbium (all figures of the table represent percentages of total weight).

| HARD COATING | 1 | 2 |
|---|---|---|
| Carbon | 2.18 | 2.15 |
| Silicon | 0.15 | 0.22 |
| Manganese | 0.22 | 0.15 |
| Chromium | 30.0 | 29.6 |
| Tungsten | 20.3 | |
| Columbium | | 18.0 |
| Cobalt | 38.4 | 45.2 |
| Iron | Balance | Balance |
| Weight loss in g./m.$^2$h. in 30% boiling HNO$_3$ | 100.4 | 1.5 |

If copper, nickel and molybdenum are incorporated in these welding wires and welding powders are used which are free of tungsten and contain carbides of columbium, tantalum and vanadium or a mixture thereof, hard coatings will be obtained which have a high abrasion resistance and a high resistance to corrosion in oxidizing and reducing environments (see Table 4). (All figures of the table represent percentages of total weight.)

TABLE 4.—COATING

|  | 1 | 2 | 3 |
| --- | --- | --- | --- |
| Carbon | 1.84 | 1.87 | 1.98 |
| Silicon | 1.24 | 1.10 | 1.17 |
| Manganese | 0.2 | 0.32 | 0.17 |
| Chromium | 28.6 | 29.5 | 28.4 |
| Columbium | 5.0 |  |  |
| Tantalum |  | 4.72 |  |
| Vanadium |  |  | 5.24 |
| Nickel | 6.2 | 7.5 | 7.8 |
| Molybdenum | 3.55 | 3.74 | 3.46 |
| Copper | 1.5 | 1.48 | 1.65 |
| Iron | 2.6 | 3.5 | 3.12 |
| Cobalt | Balance | Balance | Balance |

|  | Weight losses in grams per square meter per hour ||||||
| --- | --- | --- | --- | --- | --- | --- |
|  | Sulfuric acid || Nitric acid ||||
|  | 10% | 20% | 10% | 20% | 30% | 40% |
| At room temperature (coating): |  |  |  |  |  |  |
| 1 | 0.008 | 0.011 | 0.003 | 0.003 | 0.003 | 0.003 |
| 2 | 0.012 | 0.014 | 0.007 | 0.008 | 0.005 | 0.003 |
| 3 | 0.009 | 0.013 | 0.007 | 0.008 | 0.008 | 0.006 |
| At boiling temperature (coating): |  |  |  |  |  |  |
| 1 | 0.72 | 1.13 | 0.09 | 0.2 | 0.6 | 1.1 |
| 2 | 0.84 | 1.14 | 0.11 | 0.27 | 0.8 | 1.25 |
| 3 | 0.94 | 1.25 | 0.13 | 0.24 | 0.65 | 1.35 |

Rather than in the above-mentioned powder, the carbides for improving the abrasion resistance may be incorporated in the covering or core of a tubular electrode. The starting alloy may also be made as a sintered product by extrusion together with organic or inorganic binders, such as synthetic resin or water-glass in the form of wires or strips or may be used as a plasma arc powder where corrosion-resisting, thin layers are to be applied. In the latter case, the carbides for improving the abrasion resistance are added to the plasma arc powder. Another modification comprises extruding the carbides, which are used to improve the abrasion resistance, together with the powdered starting alloy, and organic or inorganic binders, in the form of wires or strips. For the formation of hard coatings on large surfaces, the strip is preferable to the wire.

Finally, the plasma arc powder or the powder for use in the manufacture of the sintered wires or strips may be obtained by powdering ingots of hard alloys which contain copper, nickel and/or molybdenum and which have the composition which is desired for the hard coating, with an allowance for any welding losses and dilution by the base metal. According to a prior proposal, which does not belong to the state of the art, such alloys consist, for use in reducing environments, of: 2.2–2.5% carbon, 30–32% chromium, 13–20% tungsten, 39–47% cobalt, up to 1% manganese, up to 1% silicon, 0.2–6% copper, 0–6% molybdenum, 0–10% nickel, balance iron and inevitable impurities, or, for use in oxidizing environments, of: 0.3–4% carbon, 15–40% chromium, 0–3.5% silicon, 0–2% manganese, 38–80% cobalt, 2.5–18% columbium, tantalum and vanadium, individually or in combination, balance iron and inevitable impurities, or, for use in reducing and oxidizing environments of: 0.3–4% carbon, 15–40% chromium, 0–3.5% silicon, 0–2.0% manganese, 38–80% cobalt, 2.5–18% columbium, tantalum and vanadium, individually or in combination, balance iron and inevitable impurities, part of the cobalt being replaced by 0.2–6% copper, 0.3–6% molybdenum and 0.5–10% nickel.

The welding wires according to the invention may be used in the formation of hard coatings which have a high high-temperature strength and are stable in an oxidizing and/or reducing environment. These coatings may be used in equipment employed for various purposes in the chemical industry.

Thus, the invention provides a process of providing hard coatings which have a high high-temperature strength and a high corrosion resistance and consist of alloys including cobalt, chromium, and tungsten, or of alloys including cobalt, chromium, and columbium, or of alloys including cobalt, chromium, and tantalum, or of alloys including coabt, chromium, and vanadium, and is characterized by the use of filler wires or welding powders which contain the desired carbides to improve the abrasion resistance and 0.2–6% copper, 0–6% molybdenum and 0–10.7% nickel.

What is claimed is:

1. A fused corrosion-resistant cobalt-chromium alloy to be affixed to a metallic article by means of a welding process, consisting essentially of 0.3–4 weight percent carbon, traces to 3.5 weight percent silicon, traces to 2.0 weight percent manganese, 15–40 weight percent chromium, traces to 20 weight percent tungsten, traces to 6 weight percent molybdenum, 0.2–6 weight percent copper, traces to 10.7 weight percent nickel, traces to a total of 18 weight percent of elements of the class consisting of columbium, tantalum, and vanadium, the balance consisting of cobalt.

2. An alloy as set forth in claim 1, in which said alloy consists essentially of 0.3–4 weight percent carbon, traces to 3.5 weight percent silicon, traces to 2.0 weight percent manganese 15–40 weight percent chromium, traces to 20 weight percent tungsten, traces to 6 weight percent molybdenum, 0.2–6 weight percent copper, traces to 10.7 weight percent nickel, traces to a total of 18 weight percent of elements of the class consisting of columbium, tantalum, and vanadium, balance iron, cobalt, and inevitable impurities, the total of cobalt, copper, molybdenum, and nickel being 38–80 weight percent.

3. An alloy as set forth in claim 1, in which said alloy consists essentially of 1.84–2.5 weight percent carbon, traces to 1 weight percent silicon, traces to 1 weight percent manganese, 28.4–32 weight percent chromium, 13–20 weight percent tungsten, 37.66–47 weight percent cobalt, traces to 6 weight percent molybdenum, 0.2–6 weight percent copper, traces to 10.7 weight percent nickel, traces to 5.0 weight percent columbium, traces to 4.72 weight percent tantalum, traces to 5.24 weight percent vanadium, balance iron, and inevitable impurities.

4. An alloy as set forth in claim 1, in which said alloy consists essentially of 0.3–4 weight percent carbon, traces to 3.5 weight percent silicon, traces to 2.0 weight percent manganese, 15–40 weight percent chromium, traces to 6 weight percent molybdenum, 0.2–6 weight percent copper, traces to 10 weight percent nickel, a total of 2.5–18 weight percent of elements of the group of columbium, tantalum, and vanadium, balance iron, cobalt, and inevitable impurities, the total of cobalt, copper, molybdenum, and nickel being 38–80 weight percent.

5. An alloy as set forth in claim 1, in which said coating consists essentially 1.84–2.2 weight percent carbon, 0.17–1.24 weight percent silicon, 0.17–0.32 weight percent manganese, 28.4–30.3 weight percent chromium, 14.7–19 weight percent tungsten, 37.60–40.9 weight percent cobalt, 3.0–3.74 weight percent molybdenum, 1.3–2.0 weight percent copper, 0.2–3.5 weight percent iron, traces to 10.7 weight percent nickel, traces to 5.0 weight percent columbium, traces to 4.72 weight percent tantalum, and traces to 5.24 weight percent vanadium.

6. A fused corrosion-resistant cobalt-chromium alloy to be affixed to a metallic body by means of a welding process consisting essentially of 0.3–4 weight percent carbon, traces to 3.5 weight percent silicon, traces to 2.0 weight percent manganese, 15–40 weight percent chromium, traces to 6 weight percent molybdenum, traces to 6 weight percent copper, traces to 10 weight percent nickel, a total of 2.5–18 weight percent of elements of the group consisting of columbium, tantalum, and vanadium, balance iron, cobalt, and inevitable impurities, the total of cobalt, copper, molybdenum, and nickel being 38-80 weight percent.

References Cited

UNITED STATES PATENTS

| | | | |
|---|---|---|---|
| 2,536,033 | 1/1951 | Clarke | 75—171 X |
| 2,536,034 | 1/1951 | Clarke | 75—171 X |
| 3,147,542 | 9/1964 | Boeckeler | 29—182.7 |
| 3,149,411 | 9/1964 | Smiley et al. | 29—182.7 X |
| 3,307,939 | 3/1967 | Baumel | 75—171 X |

FOREIGN PATENTS 809,088    2/1959    Great Britain.

CARL D. QUARFORTH, *Primary Examiner.*

MELVIN J. SCOLNICK, *Assistant Examiner.*

U.S. Cl. X.R.

29—182.3; 75—176; 29—191.2, 198, 199; 106—290, 1; 117—160